(12) United States Patent
Martinez et al.

(10) Patent No.: US 12,469,175 B2
(45) Date of Patent: Nov. 11, 2025

(54) SYSTEMS AND METHODS FOR INITIATING CALIBRATION OF A MULTI-VIEW CAMERA PAIR DEPLOYED IN A ROBOT

(71) Applicant: Toyota Research Institute, Inc., Los Altos, CA (US)

(72) Inventors: Edwardo Martinez, Fremont, CA (US); Vitor Campagnolo Guizilini, Santa Clara, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 18/425,469

(22) Filed: Jan. 29, 2024

(65) Prior Publication Data

US 2025/0245856 A1     Jul. 31, 2025

(51) Int. Cl.
 *H04N 13/239*     (2018.01)
 *G06T 7/80*     (2017.01)

(52) U.S. Cl.
 CPC ...... *G06T 7/85* (2017.01); *G06T 2207/10012* (2013.01); *H04N 13/239* (2018.05)

(58) Field of Classification Search
 CPC ............ G06T 7/85; G06T 2207/10012; H04N 13/239
 USPC .......................................................... 348/47
 See application file for complete search history.

(56) References Cited

U.S. PATENT DOCUMENTS 11,208,117 B2 * 12/2021 Johnson-Roberson ..................... G01C 21/1656
2022/0398780 A1 * 12/2022 Pelc ........................... G06T 7/85
2023/0401745 A1 * 12/2023 Kothari ..................... G06T 7/70
2023/0419546 A1 * 12/2023 Christopher ......... G06V 10/255

FOREIGN PATENT DOCUMENTS

WO     2022194939 A1     9/2022

OTHER PUBLICATIONS

Kanai et al. "Robust Self-Supervised Extrinsic Self-Calibration." 2023 IEEE/RSJ International Conference on Intelligent Robots and Systems (IROS). IEEE, 2023. Available at https://acrobat.adobe.com/id/urn:aaid:sc:VA6C2:97055be2-e0f5-45c6-9195-b4420fdf803e.

Gil et al. "Online training of stereo self-calibration using monocular depth estimation." IEEE Transactions on Computational Imaging 7 (2021): 13 pages. Available at https://acrobat.adobe.com/id/urn:aaid:sc:VA6C2:29c7759d-b149-475d-8e19-46b221ef2d36.

Casado et al. "Automatic Method of Camera Calibration by Genetic Programming and Symbolic Regression." Available at SSRN 4327137. 34 pages. Available at https://acrobat.adobe.com/id/urn:aaid:sc:VA6C2:71621c32-b89e-4204-acd5-b2039fb7e6eb.

* cited by examiner

*Primary Examiner* — Susan E. Hodges
(74) *Attorney, Agent, or Firm* — Christopher G. Darrow; Darrow Mustafa PC

(57) ABSTRACT

Systems and methods described herein relate to initiating calibration of a multi-view camera pair deployed in a robot. In one embodiment, a calibration initiation system in the robot monitors the reprojection error between cameras of the multi-view camera pair, the reprojection error measuring the calibration accuracy of the multi-view camera pair. The system also performs, when the reprojection error exceeds a predetermined threshold, one of (1) notifying a user that manual calibration of the multi-view camera pair is recommended and (2) initiating automatic calibration of the multi-view camera pair.

20 Claims, 4 Drawing Sheets

SYSTEMS AND METHODS FOR INITIATING CALIBRATION OF A MULTI-VIEW CAMERA PAIR DEPLOYED IN A ROBOT

TECHNICAL FIELD

The subject matter described herein relates in general to robots and, more specifically, to systems and methods for initiating calibration of a multi-view camera pair deployed in a robot.

BACKGROUND

An important aspect of robotics is machine vision. Often, machine-vision systems include a multi-view camera pair (e.g., a stereo camera pair) to provide better depth perception than a monocular camera. The calibration of a multi-view camera pair can degrade over time due to vibrations, mechanical shock (e.g., the robot colliding with or impacting other objects in the environment or such objects colliding with or impacting the robot), changes in humidity, changes in temperature, and other external factors. Consequently, the calibration of a multi-view camera pair is redone from time to time or, in some cases, frequently, depending on the kinds of tasks the robot performs and the environment in which the robot operates.

SUMMARY

Embodiments of a system for initiating calibration of a multi-view camera pair deployed in a robot are presented herein. In one embodiment, the system comprises a processor and a memory storing machine-readable instructions that, when executed by the processor, cause the processor to monitor, in the robot, the reprojection error between cameras of the multi-view camera pair, the reprojection error measuring the calibration accuracy of the multi-view camera pair. The memory also stores machine-readable instructions that, when executed by the processor, cause the processor to perform, when the reprojection error exceeds a predetermined threshold, one of (1) notifying a user that manual calibration of the multi-view camera pair is recommended and (2) initiating automatic calibration of the multi-view camera pair.

Another embodiment is a non-transitory computer-readable medium for initiating calibration of a multi-view camera pair deployed in a robot and storing instructions that, when executed by a processor, cause the processor to monitor, in the robot, the reprojection error between cameras of the multi-view camera pair, the reprojection error measuring the calibration accuracy of the multi-view camera pair. The instructions also cause the processor to perform, when the reprojection error exceeds a predetermined threshold, one of (1) notifying a user that manual calibration of the multi-view camera pair is recommended and (2) initiating automatic calibration of the multi-view camera pair.

Another embodiment is a method of initiating calibration of a multi-view camera pair deployed in a robot, the method comprising monitoring, in the robot, the reprojection error between cameras of the multi-view camera pair, the reprojection error measuring the calibration accuracy of the multi-view camera pair. The method also includes performing, when the reprojection error exceeds a predetermined threshold, one of (1) notifying a user that manual calibration of the multi-view camera pair is recommended and (2) initiating automatic calibration of the multi-view camera pair.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
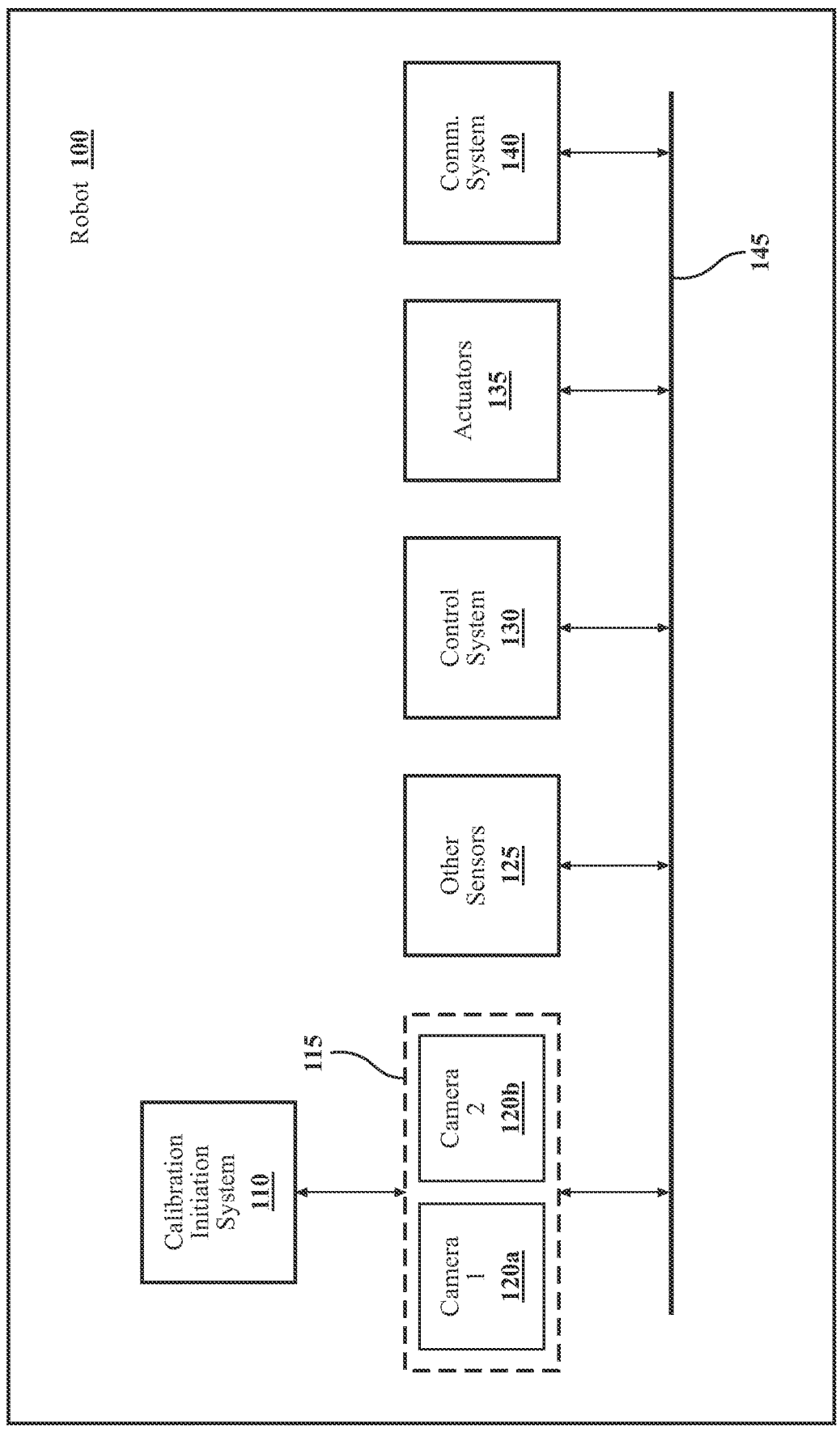
FIG. 1 is a block diagram of a robot in which various embodiments of systems and methods for initiating calibration of a multi-view camera pair can be implemented.

Various embodiments of systems and methods for initiating the calibration of a multi-view camera pair deployed in a robot described herein provide an efficient way to track the accuracy of the calibration over time so the multi-view camera pair can be either manually or automatically re-calibrated, when needed. The various embodiments repeatedly compute, over time, the reprojection error between the cameras of the multi-view camera pair to measure and monitor the accuracy of the calibration. When the calibration is accurate, the reprojection error is small (e.g., sub-pixel). When, over time, the calibration has degraded enough such that the reprojection error exceeds a predetermined threshold, the various embodiments either (1) notify a user that manual calibration of the multi-view camera pair is recommended or (2) initiate automatic calibration of the multi-view camera pair.

Degradation of the calibration can negatively impact the performance of a robot. For example, the high depth accuracy a multi-view camera provides supports metric scale estimation (estimation of the sizes of objects in a scene and the distances between objects). Degradation of the multi-view-camera calibration also degrades the ability of the robot to estimate metric scale. This can adversely affect the ability of the robot to interact with objects in its environment.

In some embodiments, the multi-view camera pair is a stereo camera pair. In other embodiments, the setup or arrangement of the two cameras does not necessarily satisfy all the requirements for stereo imagery, but the cameras nevertheless have somewhat overlapping fields of view (FOV). Note that, for the more general case of multi-view imagery (as opposed to the special case of stereo imagery), the two cameras do not have to be in the same plane.

In some embodiments, the reprojection error is a combination (e.g., an arithmetic average or weighted average) of a first reprojection error computed for the first camera in the multi-view camera pair with respect to the frame of reference of the second camera and a second reprojection error computed for the second camera with respect to the frame of reference of the first camera. In this context, the designations "first camera" and "second camera" are arbitrary. Either could refer, for example, to the left camera or the right camera in a multi-view camera pair.

In some embodiments in which a user is notified of the need for manual calibration, the calibration initiation system transmits a notification from the robot to a device (e.g., a smartphone or computer) associated with the user. In embodiments in which the system, in response to the reprojection-error threshold being exceeded, initiates automatic calibration, the system executes a machine-learning algorithm that minimizes the reprojection error, thereby updating the calibration parameters of the multi-view camera pair.

In some embodiments, the robot is an autonomous vehicle. Examples of autonomous vehicles include, without limitation, autonomous automobiles and trucks, autonomous delivery robots, autonomous search-and-rescue robots, and autonomous unmanned aerial vehicles (aka "drones"). In other embodiments, the robot is a humanoid robot. Examples of humanoid robots include, without limitation, service robots, companionship robots, some types of medical robots, and some types of security robots.

FIG. 1 is a block diagram of a robot 100 in which various embodiments of systems and methods for initiating calibration of a multi-view camera pair can be implemented. In the embodiment of FIG. 1, robot 100 includes a multi-view camera pair 115; other sensors 125; a control system 130; actuators 135 that enable robot 100 to move and, in some embodiments, interact with its environment; and a communication system 140. The foregoing elements can communicate with one another over one or more data buses 145. Robot 100 also includes a calibration initiation system 110 that monitors the accuracy of the calibration of the multi-view camera pair 115. As discussed above, if the computed reprojection error between Camera 1 (120a) and Camera 2 (120b) of the multi-view camera pair 115 exceeds a predetermined threshold, calibration initiation system 110 either notifies a human user that manual calibration is needed, or the system initiates automatic calibration of the multi-view camera pair 115 within robot 100. Other sensors 125 can include, for example, one or more of Light Detection and Ranging (LIDAR) sensors, radar sensors, sonar sensors, positioning sensors, and accelerometers.

Figure 2:
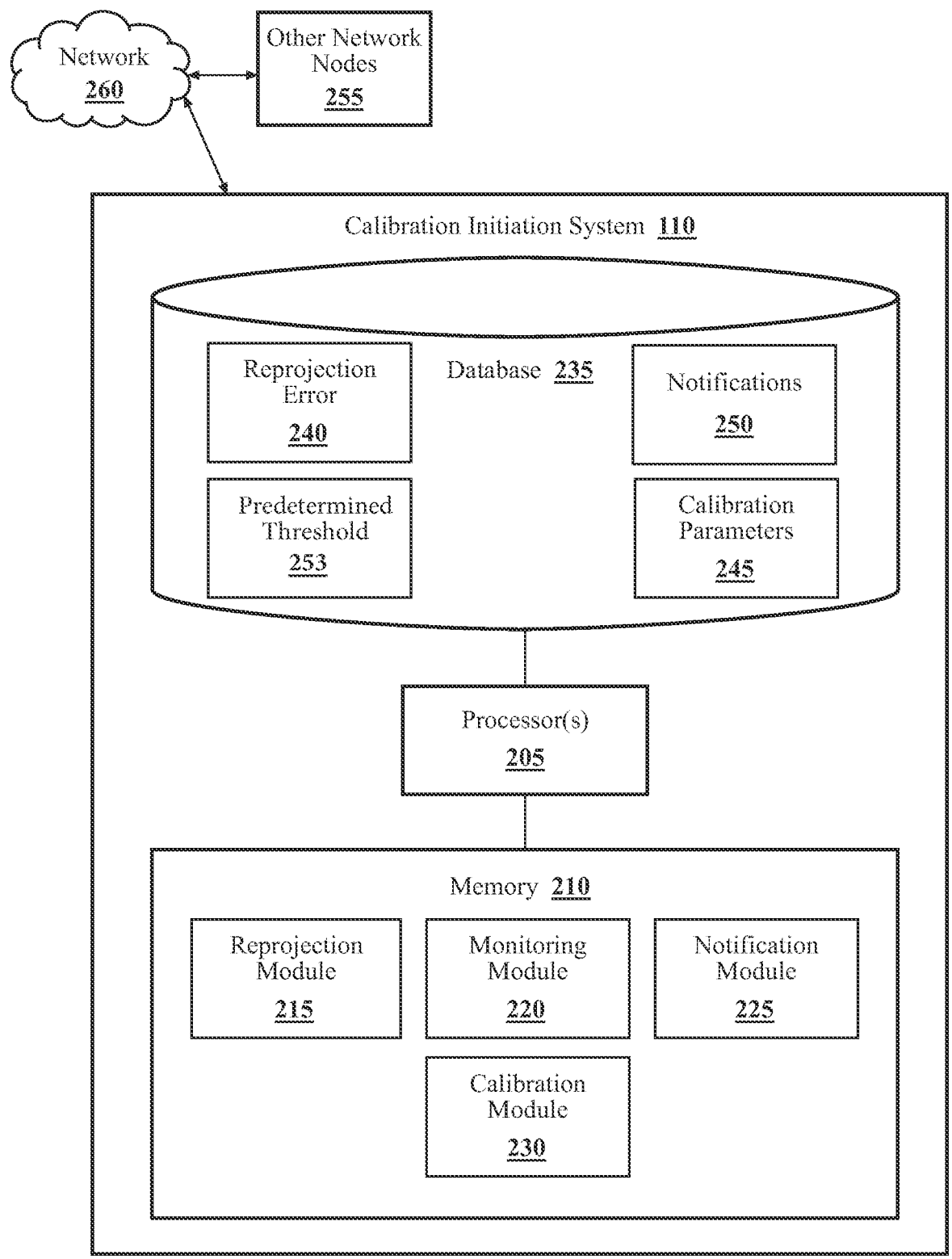
FIG. 2 is a block diagram of a calibration initiation system, in accordance with an illustrative embodiment of the invention.

FIG. 2 is a block diagram of a calibration initiation system 110, in accordance with an illustrative embodiment of the invention. In FIG. 2, calibration initiation system 110 includes one or more processors 205 to which a memory 210 is communicably coupled. The one or more processors 205 can be one or more dedicated processors, or the one or more processors 205 can coincide with one or more processors in robot 100 that are used for other purposes (e.g., control system 130). Memory 210 stores a reprojection module 215, a monitoring module 220, a notification module 225, and a calibration module 230. The memory 210 is a random-access memory (RAM), read-only memory (ROM), a hard-disk drive, a flash memory, or other suitable non-transitory memory for storing the modules 215, 220, 225, and 230. The modules 215, 220, 225, and 230 are, for example, machine-readable instructions that, when executed by the one or more processors 205, cause the one or more processors 205 to perform the various functions disclosed herein.

As shown in FIG. 2, calibration initiation system 110 can store various kinds of data in a database 235. For example, calibration initiation system 110 can store reprojection error 240, calibration parameters 245, notifications 250, and a predetermined reprojection-error threshold 253 (hereinafter "predetermined threshold 253"). These data items are discussed in greater detail below.

As depicted in FIG. 2, calibration initiation system 110 can communicate with other network nodes 255 (e.g., other robots, cloud servers, infrastructure devices, mobile devices, etc.) via a network 260. In some embodiments, network 260 includes the Internet. In communicating with other network nodes 255, calibration initiation system 110 may use any of a variety of wireless communication technologies such as IEEE 802.11 (WiFi), cellular data, Bluetooth®, Bluetooth® Low Energy (Bluetooth® LE), and Dedicated Short-Range Communications (DSRC).

Reprojection module 215 generally includes instructions that, when executed by the one or more processors 205, cause the one or more processors 205 to calculate the reprojection error 240 between Camera 1 (120a) and Camera 2 (120b) of the multi-view camera pair 115. The process of calculating reprojection error 240 is discussed in greater detail below in connection with FIG. 3. As discussed above, in some embodiments reprojection error 240 is calculated in both directions—for Camera 1 (120a) with respect to the frame of reference of Camera 2 (120b) and for Camera 2 (120b) with respect to the frame of reference of Camera 1 (120a)—and combined (e.g., through an arithmetic or weighted average).

Reprojection module 215 automatically recalculates reprojection error 240 frequently enough over time to enable monitoring module 220 (discussed further below) to detect degradation in the calibration accuracy between Camera 1 (120a) and Camera 2 (120b) promptly so that calibration (manual or automatic) can be performed to update and restore the accuracy of the calibration parameters 245. How frequently reprojection module 215 recalculates reprojection error 240 depends on what kind robot robot 100 is and in what kind of environment and under what conditions robot 100 operates. In some embodiments, the frequency with which reprojection error 240 is recalculated is adjusted automatically and dynamically over time in response to the operational history of robot 100 (e.g., how rapidly calibration has degraded in the past, how frequently robot 100 experiences mechanical shocks, how frequently robot 100 is exposed to extremes in temperature and/or humidity, etc.).

Monitoring module 220 generally includes instructions that, when executed by the one or more processors 205, cause the one or more processors 205 to monitor, in the robot 100, the reprojection error 240 between Camera 1 (120a) and Camera 2 (120b) of the multi-view camera pair 115. Reprojection error 240 acts as a figure of merit that measures the calibration accuracy of the multi-view camera pair 115. Monitoring module 220 also includes instructions that, when executed by the one or more processors 205, cause the one or more processors 205 to perform one of the following when the reprojection error 240 exceeds the predetermined threshold 253: (1) notifying a user that manual calibration of the multi-view camera pair 115 is recommended and (2) initiating automatic calibration of the multi-view camera pair 115. In one embodiment, the predetermined threshold 253 is one pixel. That is, if the reprojection error 240 exceeds one pixel, monitoring module 220 initiates either manual or automatic calibration of the multi-view camera pair 115.

In embodiments in which multi-view camera pair 115 is manually recalibrated in response to reprojection error 240 exceeding the predetermined threshold 253, monitoring module 220 activates notification module 225 to initiate manual calibration of multi-view camera pair 115. Notification module 225 generally includes instructions that, when executed by the one or more processors 205, cause the one or more processors 205 to transmit a notification from the robot 100 to a device (e.g., a smartphone or computer) associated with the user. The notification (e.g., a text message or e-mail message) recommends to the user manual calibration of the multi-view camera pair 115 to restore the desired level of performance accuracy. In a different embodiment, notification module 225 saves a log entry in database 235 indicating the need for re-calibration. A user can then ascertain the calibration status by viewing the log file or polling it via an app. In yet another embodiment, the reprojection error 240 itself can be reported to another network node 255.

As those skilled in the art are aware, in manual calibration, a user presents a calibration target (e.g., a printed test pattern on a poster) to the multi-view camera pair 115, usually in multiple different positions, and the collection of images produced is used to perform the calibration. As those skilled in the art are also aware, calibrating a multi-view camera pair 115 involves measuring (ascertaining) the rotational and translational parameters (e.g., a 4×4 rotation and translation matrix) between the frames of reference (viewpoints) of the two cameras, Camera 1 (120a) and Camera 2 (120b). These rotational and translational parameters are the calibration parameters 245 mentioned above. In other words, calibration ascertains the "corresponding points" between the two cameras of the multi-view camera pair 115. Over time, that information (calibration parameters 245) can become out of date due to the operational and environmental factors discussed above.

In embodiments in which multi-view camera pair 115 is automatically recalibrated in response to reprojection error 240 exceeding the predetermined threshold 253, monitoring module 220 activates calibration module 230 to initiate automatic calibration of multi-view camera pair 115. Calibration module 230 generally includes instructions that, when executed by the one or more processors 205, cause the one or more processors 205 to execute an automatic calibration algorithm to calibrate multi-view camera pair 115. In some embodiments, the automatic calibration algorithm involves training a machine-learning-based (e.g., neural-network-based) model using the reprojection error 240 as a loss function. The algorithm iteratively computes the reprojection error 240 and adjusts the model weights until the reprojection error 240 is minimized. At that point, the model has learned the transformational relationship (calibration parameters 245) between the two cameras, Camera 1 (120a) and Camera 2 (120b). The weights of the auto-calibration model can then be frozen (held constant) until monitoring module 220 again detects that the calibration parameters 245 need to be updated, at which time monitoring module 220 can initiate another automatic calibration. In some embodiments, calibration module 230 carries out automatic calibration of multi-view camera pair 115 while robot 100 is operating normally to carry out its day-to-day tasks.

Figure 3:
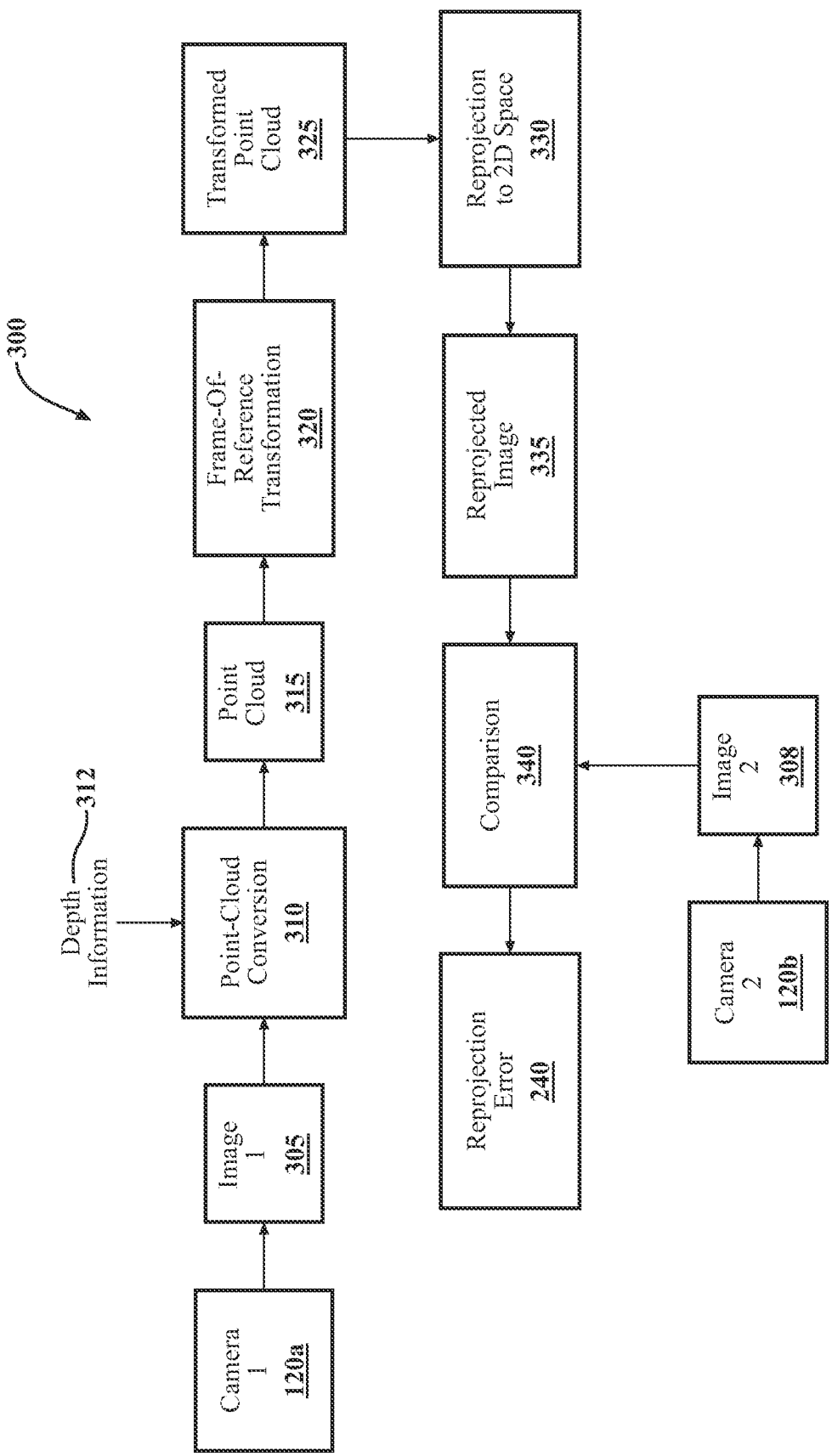
FIG. 3 is a diagram of a reprojection-error calculation process, in accordance with an illustrative embodiment of the invention.

FIG. 3 is a diagram of a reprojection-error calculation process 300 carried out by reprojection module 215 and, in an embodiment including automatic calibration, by calibration module 230, in accordance with an illustrative embodiment of the invention. In FIG. 3, an Image 1 (305) from Camera 1 (120a) is converted to a three-dimensional (3D) point cloud 315 via a point-cloud conversion 310 based on estimated or ground-truth depth information 312. Depth information 312 can be obtained in several different ways, depending on the embodiment. For example, depth information 312 can be obtained from LIDAR data, a RGB-D camera, or a trained monocular depth estimation (MDE) machine-learning model separate from multi-view camera pair 115. The point cloud 315 is transformed to the frame of reference of Camera 2 (120b) in accordance with the currently stored calibration parameters 245. This frame-of-reference transformation 320 produces a transformed point cloud 325. The transformed point cloud 325 is reprojected to two-dimensional (2D) space (330), yielding a reprojected image 335. Reprojected image 335 is then compared (340) with an image from Camera 2 (120b), Image 2 (308), that corresponds to Image 1 (305) (i.e., Image 2 (308) is an image of the same scene as Image 1 (305) but from the viewpoint of Camera 2 (120b)). This comparison (340) yields the reprojection error 240. In some embodiments, reprojection error 240 is the L2 (root-mean-squared) error in units of pixels. In those embodiments, in 2D image space, the L2 error is the Euclidean distance between the reprojected (reprojected image 335) and reference (Image 2 (308)) pixels.

FIG. 3 diagrams the calculation of reprojection error 240 for Camera 1 (120a) with respect to the frame of reference of Camera 2 (120b). As discussed above, the roles of Camera 1 (120a) and Camera 2 (120b) in FIG. 3 can be reversed to compute reprojection error 240 in the other direction (reprojection error 240 for Camera 2 (120b) with respect to the frame of reference of Camera 1 (120a)). As also discussed above, in some embodiments the reprojection error is computed in both directions, and the two reprojection errors are combined (e.g., through an arithmetic or weighted average) to produce the reprojection error 240.

Figure 4:
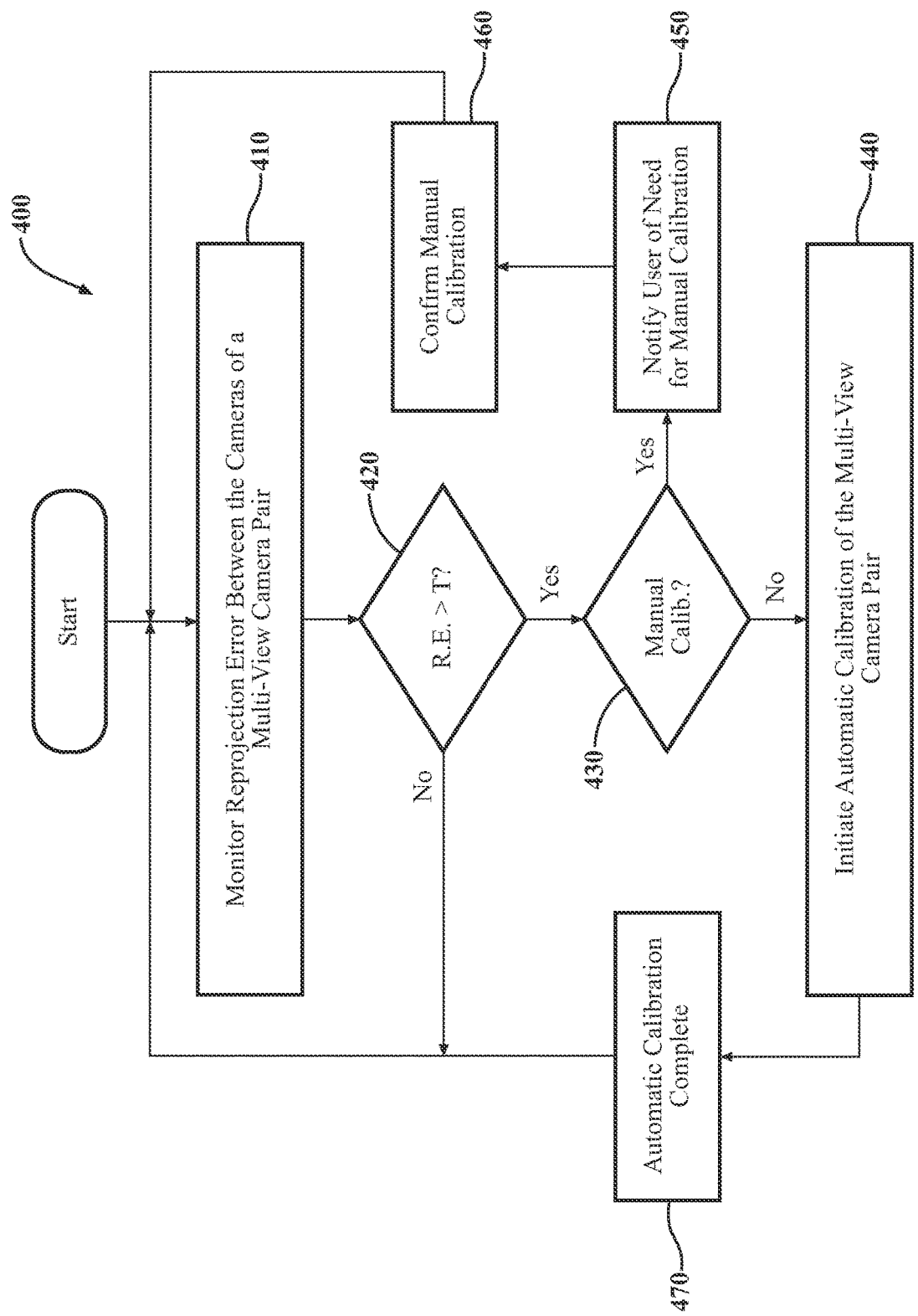
FIG. 4 is a flowchart of a method of initiating the calibration of a multi-view camera pair deployed in a robot, in accordance with an illustrative embodiment of the invention.

FIG. 4 is a flowchart of a method 400 of initiating the calibration of a multi-view camera pair 115 deployed in a robot 100, in accordance with an illustrative embodiment of the invention. Method 400 will be discussed from the perspective of calibration initiation system 110 in FIG. 2. While method 400 is discussed in combination with calibration initiation system 110, it should be appreciated that method 400 is not limited to being implemented within calibration initiation system 110, but calibration initiation system 110 is instead one example of a system that may implement method 400.

At block 410, monitoring module 220 monitors, in robot 100, the reprojection error 240 between Camera 1 (120a) and Camera 2 (120b) of a multi-view camera pair 115. As discussed above, the reprojection error 240 calculated by reprojection module 215 measures the calibration accuracy of the multi-view camera pair 115.

If the reprojection error 240 ("R.E." in FIG. 4) does not exceed a predetermined threshold 253 ("T" in FIG. 4) at block 420, control returns to block 410. Otherwise, if the predetermined threshold 253 is exceeded at block 420, control proceeds to block 430. If, at block 430, monitoring module 220 determines that manual calibration is to be performed, monitoring module 220, at block 450, notifies a user via notification module 225 that manual calibration of the multi-view camera pair 115 is recommended. Once calibration initiation system 110 has confirmed, at block 460, that the manual calibration has been completed, control returns to block 410 (the reprojection error 240 is again monitored over time).

If, at block 430, monitoring module 220 determines that automatic calibration is to be performed, monitoring module 220, at block 440, initiates automatic calibration of the multi-view camera pair 115 via calibration module 230. Once calibration initiation system 110 has confirmed, at block 470, that automatic calibration has been completed, control returns to block 410 (the reprojection error 240 is again monitored over time).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The components described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " As used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system, comprising:
 a processor; and
 a memory storing machine-readable instructions that, when executed by the processor, cause the processor to:
  calculate a reprojection error as a combination of first and second reprojection errors between a first camera and a second camera of a multi-view camera pair deployed in a robot, wherein:

the first reprojection error is computed by converting a first image from the first camera to a first reprojected image reprojected from a three-dimensional (3D) point cloud transformed to a frame of reference of the second camera and comparing the first reprojected image with an image from the second camera that corresponds to the first image; and the second reprojection error is computed by converting a second image from the second camera to a second reprojected image reprojected from a 3D point cloud transformed to a frame of reference of the first camera and comparing the second reprojected image with an image from the first camera that corresponds to the second image; and perform, when the reprojection error exceeds a predetermined threshold, one of:

notifying a user that manual calibration of the multi-view camera pair is recommended; and initiating automatic calibration of the multi-view camera pair.

2. The system of claim 1, wherein the multi-view camera pair is a stereo camera pair.

3. The system of claim 1, wherein the first image is converted to the 3D point cloud transformed to the frame of reference of the second camera and the second image is converted to the 3D point cloud transformed to the frame of reference of the first camera based on one of estimated and ground-truth depth information.

4. The system of claim 3, wherein the combination is an average.

5. The system of claim 1, wherein notifying the user that manual calibration of the multi-view camera pair is recommended includes transmitting a notification from the robot to a device associated with the user.

6. The system of claim 1, wherein the automatic calibration includes minimizing the reprojection error.

7. The system of claim 1, wherein the robot is one of an autonomous vehicle and a humanoid robot.

8. A non-transitory computer-readable medium storing instructions that, when executed by a processor, cause the processor to:

calculate a reprojection error as a combination of first and second reprojection errors between a first camera and a second camera of a multi-view camera pair deployed in a robot, wherein:

the first reprojection error is computed by converting a first image from the first camera to a first reprojected image reprojected from a three-dimensional (3D) point cloud transformed to a frame of reference of the second camera and comparing the first reprojected image with an image from the second camera that corresponds to the first image; and the second reprojection error is computed by converting a second image from the second camera to a second reprojected image reprojected from a 3D point cloud transformed to a frame of reference of the first camera and comparing the second reprojected image with an image from the first camera that corresponds to the second image; and perform, when the reprojection error exceeds a predetermined threshold, one of:

notifying a user that manual calibration of the multi-view camera pair is recommended; and initiating automatic calibration of the multi-view camera pair.

9. The non-transitory computer-readable medium of claim 8, wherein the multi-view camera pair is a stereo camera pair.

10. The non-transitory computer-readable medium of claim 8, wherein the first image is converted to the 3D point cloud transformed to the frame of reference of the second camera and the second image is converted to the 3D point cloud transformed to the frame of reference of the first camera based on one of estimated and ground-truth depth information.

11. The non-transitory computer-readable medium of claim 8, wherein notifying the user that manual calibration of the multi-view camera pair is recommended includes transmitting a notification from the robot to a device associated with the user.

12. The non-transitory computer-readable medium of claim 8, wherein the automatic calibration includes minimizing the reprojection error.

13. The non-transitory computer-readable medium of claim 8, wherein the robot is one of an autonomous vehicle and a humanoid robot.

14. A method, comprising:

calculating a reprojection error as a combination of first and second reprojection errors between a first camera and a second camera of a multi-view camera pair deployed in a robot, wherein:

the first reprojection error is computed by converting a first image from the first camera to a first reprojected image reprojected from a three-dimensional (3D) point cloud transformed to a frame of reference of the second camera and comparing the first reprojected image with an image from the second camera that corresponds to the first image; and the second reprojection error is computed by converting a second image from the second camera to a second reprojected image reprojected from a 3D point cloud transformed to a frame of reference of the first camera and comparing the second reprojected image with an image from the first camera that corresponds to the second image; and performing, when the reprojection error exceeds a predetermined threshold, one of:

notifying a user that manual calibration of the multi-view camera pair is recommended; and initiating automatic calibration of the multi-view camera pair.

15. The method of claim 14, wherein the multi-view camera pair is a stereo camera pair.

16. The method of claim 14, wherein the first image is converted to the 3D point cloud transformed to the frame of reference of the second camera and the second image is converted to the 3D point cloud transformed to the frame of reference of the first camera based on one of estimated and ground-truth depth information.

17. The method of claim 16, wherein the combination is an average.

18. The method of claim 14, wherein notifying the user that manual calibration of the multi-view camera pair is recommended includes transmitting a notification from the robot to a device associated with the user.

19. The method of claim 14, wherein the automatic calibration includes minimizing the reprojection error.

20. The method of claim 14, wherein the robot is one of an autonomous vehicle and a humanoid robot.

* * * * *